United States Patent [19]

Kerth et al.

[11] Patent Number: 4,713,430
[45] Date of Patent: Dec. 15, 1987

[54] PREPARATION OF ETHENE POLYMERS BY MEANS OF A ZIEGLER CATALYST SYSTEM

[75] Inventors: Juergen Kerth, Maxdorf; Heinz Vogt, Ludwigshafen, both of Fed. Rep. of Germany

[73] Assignee: BASF Aktiengesellschaft, Ludwigshafen, Fed. Rep. of Germany

[21] Appl. No.: 945,085

[22] Filed: Dec. 22, 1986

[30] Foreign Application Priority Data

Dec. 24, 1985 [DE] Fed. Rep. of Germany ....... 3546018

[51] Int. Cl.⁴ ................................................ C08F 4/64
[52] U.S. Cl. ...................................... 526/159; 502/108; 502/109; 526/352; 526/904
[58] Field of Search ................. 526/159; 502/108, 109

[56] References Cited

U.S. PATENT DOCUMENTS

| | | | |
|---|---|---|---|
| 3,067,183 | 12/1962 | Hagemeyer et al. | 502/108 X |
| 3,404,096 | 10/1968 | Lamborn | 502/108 |
| 4,329,251 | 5/1982 | Sunada et al. | 502/126 |
| 4,387,201 | 6/1983 | Bahadir et al. | 502/109 X |
| 4,463,145 | 7/1984 | Sunada et al. | 526/142 |

FOREIGN PATENT DOCUMENTS 1300734 12/1972 United Kingdom .

*Primary Examiner*—Patrick P. Garvin
*Attorney, Agent, or Firm*—Keil & Weinkauf

[57] ABSTRACT

Finely divided ethene polymers are prepared by means of a Ziegler catalyst system composed of (1) a titanium-containing catalyst component obtained by precipitation in an organic liquid from (1.1) a solution of titanium tetrachloride in a hydrocarbon, (1.2) a solution of a certain organoaluminum compound in a hydrocarbon, and a catalyst component which contains (1.3) an alpha-monoalkene and (2) aluminum, wherein the (1) used has been precipitated at relatively low temperatures in an organic liquid which, at the precipitation temperature has a relatively high viscosity and comprises (a) a liquid hydrocarbon and (b), dissolved therein, relatively small amounts of polymer of an alpha-monoalkene, with the provisos that (i) for every gram-mole of the total amount of titanium tetrachloride used specific amounts of the organic liquid, of the organoaluminum compound and of the alpha-monoalkene are used and (ii) for every mole unit of the total amount of titanium tetrachloride used specific amounts are precipitated per minute and specific amounts of the alpha-monoalkene are introduced per minute.

1 Claim, No Drawings

PREPARATION OF ETHENE POLYMERS BY MEANS OF A ZIEGLER CATALYST SYSTEM

The present invention relates to a process for preparing finely divided homopolymers of ethene or copolymers of ethene with minor amounts of $C_3$–$C_8$, in particular $C_4$–$C_6$, alphamonoalkene by polymerizing the monomer(s) at 30°–150° C. in particular 50°–120° C., and 1–200 bar, in particular 5–50 bar, by means of a Ziegler catalyst system composed of (1) a titanium-containing catalyst component obtained as a precipitated product by bringing about a precipitation in a previously introduced organic liquid by introducing and bringing together with vigorous agitation (1.1) a 0.1–10M, in particular 1–2M, solution of titanium tetrachloride in a liquid saturated aliphatic and/or aromatic hydrocarbon of 5–10, in particular 6–8, carbon atoms, (1.2) a 0.1–10M, in particular 1–2M, solution of an organoaluminum compound of the empirical formula $R_nAlCl_{3-n}$, where n is a number within the range from 1.5 to 3, in particular from 1.5 to 2, and R is alkyl of 1–12, in particular 2–4, carbon atoms, in a liquid saturated aliphatic and/or aromatic hydrocarbon of 5–10, in particular 6–8, carbon atoms and (1.3) a $C_2$–$C_8$, preferably $C_2$–$C_4$-, alphamonoalkene, in particular ethene, and (2) an aluminum-containing catalyst component which is a trialkylaluminum which contains 1–12, in particular 2–4 carbon atoms per alkyl group,
with the proviso that the atomic ratio of titanium in catalyst component (1):aluminum in catalyst component (2) lies within the range from 1:1 to 1:200, in particular from 1:5 to 1:20.

Polymerization processes of this type are known, for example from U.S. Pat. Nos. 4,329,251 and 4,463,145.

At the heart of the type of process in question, as with other parallel processes, is a particular embodiment of the titanium-containing catalyst component (1).

Particular embodiments of this catalyst component (1) exist as we know to achieve certain objectives, such as the following:

(a) Catalyst systems which are capable of producing an increased yield of polymer, namely catalyst systems having an increased productivity, i.e. systems where the amount of polymer formed per unit weight of transition metal of catalyst component (1) is increased.

(b) Catalyst systems whereby little or no halogen is introduced into the polymer; which can be achieved by (b$_1$) raising the yield as per (a) and/or (b$_2$) using catalyst components (1) which contain no or little halogen.

(c) Catalyst systems which in the copolymerization of ethylene with higher alpha-monoolefins lead to copolymers having distinctly reduced polymer densities.

(d) Catalyst systems which are simple and reliable to manufacture and easy to handle; for example those which are prepared in (inert) hydrocarbon media.

(e) Catalyst systems which require comparatively small amounts of aluminum-containing component (2); with which it is possible, for example, to reduce deposits on and corrosion damage to reactor parts.

(f) Catalyst systems whereby the morphological properties of the polymers are affected in a certain way, for example in the direction of the uniform particle size and/or a reduction in the proportion of very fine particles and/or a high bulk density; which can be of importance for the industrial control of the polymerization systems, the confectioning of the polymers and/or the processability of the polymers.

(g) Catalyst systems which combine high overall productivity with a high initial activity which substantially prevents catalyst inclusions in the polymer and ensures that the distribution of the catalyst system is particularly good.

According to experience to date, among the many and varied objectives there are some which can only be achieved through a particular embodiment of the catalyst system if other objectives are neglected.

In these circumstances it is generally desirable to develop those embodiments which not only achieve the stated objectives but minimize the neglect of other desirable objectives.

It is an object of the present invention to provide a novel titanium-containing catalyst component (1) with which it is possible to obtain better results, given comparable objectives, than with known titanium-containing catalyst components (1), in particular as regards the aforementioned objectives (f) and (g) in respect of which performance is to be maximized while, at the same time, objectives (a) and (b) are also to be achieved satisfactorily.

We have found that this object is achieved by using in the above-defined polymerization process a Ziegler catalyst system whose titanium-containing catalyst component (1) is such that in the course of its preparation the precipitation has been brought about at relatively low temperatures in a relatively viscous, previously introduced liquid from (a) a liquid hydrocarbon and (b), dissolved therein, an alpha-monoalkene polymer by specifying certain quantitative and quantity/time relations.

The present invention accordingly provides a process for preparing finely divided homopolymers of ethene or copolymers of ethene with minor amounts of $C_3$–$C_8$-, in particular $C_4$–$C_6$-, alpha-monoalkene by polymerizing the monomer(s) at 30°–150° C., in particular 50°–120° C., and 1–200, in particular 5–50, bar by means of a Ziegler catalyst system composed of (1) a titanium-containing catalyst component obtained as a precipitated product by bringing about a precipitation in a previously introduced organic liquid by introducing and bringing together with vigorous agitation (1.1) a 0.1–10M, in particular 1–2M, solution of titanium tetrachloride in a liquid saturated aliphatic and/or aromatic hydrocarbon of 5–10, in particular 6–8, carbon atoms, (1.2) a 0.1–10M, in particular 1–2M, solution of an organoaluminum compound of the empirical formula $R_nAlCl_{3-n}$, where n is a number within the range from 1.5 to 3, in particular from 1.5 to 2, and R is alkyl of 1–12, in particular 2–4, carbon atoms, in a liquid saturated aliphatic and/or aromatic hydrocarbon of 5–10, in particular 6–8, carbon atoms and (1.3) a $C_2$–$C_8$, preferably $C_2$–$C_4$-, alpha-monoalkene, in particular ethene, and (2) an aluminum-containing catalyst component which is a trialkylaluminum which contains 1–12, in particular 2–4, carbon atoms per alkyl group,
with the proviso that the atomic ratio of titanium in catalyst component (1):aluminum in catalyst component (2) lies within the range from 1:1 to 1:200, in particular from 1:5 to 1:20.

In the process according to the invention, the titanium-containing catalyst component (1) used is one where the precipitation has been brought about at temperatures within the range from −30 to +30, in particular from −10° to +10° C., in a previously introduced organic liquid which, at the precipitation temperature, has a viscosity within the range from 1.5 to 30, preferably from 5 to 15, in particular from 8 to 12, mm$^2$/s and comprises (a) a liquid saturated aliphatic and/or aromatic hydrocarbon of 5–10, in particular 6–8, carbon atoms and (b), dissolved therein relatively small amounts of a polymer of a $C_2$–$C_6$-alpha-monoalkene, preferably a $C_3$–$C_4$-alpha-monoalkene, and in particular of a homopolymer of isobutene, with the provisos that (i) for every gram-mole of the total amount of titanium tetrachloride used a total of 2–20, in particular 3.5–5, liters of the previously introduced organic liquid, a total of 0.5–5, in particular 1–2, gram-moles of the organoaluminum compound and a total of 5–500, in particular 20–100, gram-moles of the alpha-monoalkene are used, and (ii) for every mole unit of the total amount of titanium tetrachloride used 0.002 to 0.15, in particular 0.005–0,02, mole units per minute are converted into a precipitated product and 0.02–1, in particular 0.15–0.35, mole unit per minute of the alpha-monoalkene are introduced into the precipitation system.

Use of the titanium-containing catalyst component (1) obtained according to the invention is possible with virtually all technological embodiments of the polymerization process customary in the art, for example batchwise, cyclical or continuous processes, whether, for example, in the form of a suspension polymerization process or dry-phase polymerization process in a stirred or fluidized bed. The technological embodiments mentioned, i.e. the technological variants of the Ziegler polymerization of olefins, are so well known in theory and practice that further explanations are superfluous.

It is to be noted, however, that the novel titanium-containing catalyst component (1), like corresponding known catalyst components, can for example be brought together with catalyst component (2) outside or inside the polymerization space, in the latter case, for example by separate addition of the components, which, moreover, can be handled in the form of a suspension (catalyst component (1)) or solution (catalyst component (2)).

Finally, it is also to be noted that the novel catalyst component (1) is suitable not only for preparing homopolymers of ethene but also for preparing copolymers of ethene and that suitable comonomers, in addition to propene and oct-1-ene, are in particular but-1-ene and hex-1-ene. The molecular weights of the polymers can be controlled in a conventional manner, in particular by means of hydrogen as regulant.

In what follows, the titanium-containing catalyst (1) according to the invention as such will be discussed:

Said component is obtained as a precipitated product by bringing about a precipitation in a previously introduced organic liquid by introducing and bringing together with vigorous agitation, i.e. constant vigorous stirring (since the intensity of stirring is known to have an effect on the morphology of the catalyst component in question), (1.1) a previously defined solution of titanium tetrachloride in a liquid hydrocarbon, (1.2) a previously defined solution of an organoaluminum compound in a liquid hydrocarbon, and (1.3) a previously defined alpha-monoalkene.

This procedure per se is the state of the art up to that point and is easy to implement for the skilled worker; hence further remarks on this matter are superfluous. However, concerning the material aspect it may be added that, in the given context, a particularly highly suitable liquid hydrocarbon for the solutions of (1.1) and (1.2) is n-hexane, n-heptane or n-octane; but toluene and cyclohexane, for example, are likewise suitable. Specific examples of suitable organoaluminum compounds for the solution (1.2) are diethylaluminum chloride and aluminum sesquichloride; but it is also possible to use, for example, trioctyl aluminum. As regards the alpha-monoalkene of (1.3), ethene is most highly suitable, propene and 4-methylpent-1-ene are highly suitable and, for example, but-1-ene and hex-1-ene are suitable.

In the abovementioned context, it is a novel and particular feature of the invention that the titanium-containing catalyst component (1) is obtained by bringing about the precipitation at temperatures within the range from −30° to +30° C., in particular from −10° to +10° C., in a previously introduced organic liquid which, at the precipitation temperature, has a viscosity within the range from 1.5 to 30, preferably from 5 to 15, in particular from 8 to 12, mm$^2$/ s and comprises (a) a liquid saturated aliphatic and/or aromatic hydrocarbon of 5–10, in particular 6–8, carbon atoms and (b), dissolved therein, relatively small amounts of a polymer of a $C_2$–$C_6$-alpha-monoalkene, preferably of a $C_3$–$C_4$-alpha-monoalkene, and in particular of a homopolymer of isobutene, with the provisos that (i) for every gram-mole of the total amount of titanium tetrachloride used a total of 2–20, in particular 3.5–5, liters of the previously introduced organic liquid, a total of 0.5–5, in particular 1–2, gram-moles of the organoaluminum compound and a total of 5–500, in particular 20–100, gram-moles of the alpha-monoalkene are used, and (ii) for every mole unit of the total amount of titanium tetrachloride used from 0.002 to 0.15, in particular from 0.005 to 0.02, mole units per minute are converted into precipitated product and from 0.02 to 1, in particular from 0.15 to 0.35, mole units per minute of the alpha-monoalkene are introduced into the precipitation system.

Particular importance attaches here to the previously introduced organic liquid which (i) comprises two components, namely (a) the liquid hydrocarbon and (b) the alpha-monoalkene polymer dissolved therein and which (ii), at the selected precipitation temperature, must have a viscosity within the range specified above (setting the desired viscosity is possible in a very simple manner via the dissolved amount of the selected alpha-monoalkene polymer: the larger the dissolved amount, the higher the viscosity).

There now follow notes concerning the material aspect of the previously introduced organic liquid:

The liquid hydrocarbon used is particularly highly suitably n-hexane, n-heptane or n-octane; toluene and cyclohexane, for example, are highly suitable.

An alpha-monoalkene polymer is suitable if the solution viscosity thereof (according to DIN 53 728/Sheet 4) ranges from 100 to 800, in particular from 500 to 700, cm$^3$/g.

A suitable alpha-monoalkene polymer is primarily isobutene homopolymer, which is more suitable than, for example, poly-1-hexene.

A suitable aluminum-containing catalyst component (2) of the Ziegler catalyst system to be used according to the invention is any trialkylaluminium compound customary in the art; they are so well known in the literature and in practice that they need not be discussed in more detail. Examples are triethylaluminum, triisobutylaluminum and tri-n-butylaluminum.

It is finally to be noted that the titanium-containing catalyst components (1) according to the invention are sensitive to hydrolysis and oxidation. Hence these substances should be handled under the usual precautions for Ziegler catalysts (for example absence of moisture, inert gas atmosphere).

EXAMPLE

Preparation of titanium-containing catalyst component (1)

A precipitation is brought about in a previously introduced organic liquid by introducing and bringing together with vigorous agitation by means of constant stirring (1.1) a 1.5M solution of titanium tetrachloride in n-neptane (1.2) a 1.5M solution of an organoaluminum compound of the empirical formula $R_nAlCl_{3-n}$, where n is 2 and R is ethyl, in n-heptane and (1.3) ethene.

According to the invention, the details are that the precipitation is brought about at 0° C. in a previously introduced organic liquid which, at the precipitation temperature, has a viscosity of 11 mm$^2$/s and comprises (a) n-heptane (100 parts by weight) and (b), dissolved therein, relatively small amounts (0.9 part by weight) of a homopolymer of isobutene which has a solution viscosity (according to DIN 53 728/Sheet 4) of 600 cm$^3$/g, with the provisos that (i) for every gram-mole of the total amount of titanium tetrachloride used a total of 4 liters of a previously introduced organic liquid, a total of 2 gram-moles of the organoaluminum compound and a total of 60 gram-moles of ethene are used and (ii) for every mole unit of the total amount of titanium tetrachloride used 0.008 mole units per minute are converted into precipitated product and 0.15 mole units per minute of ethene are introduced into the precipitation system.

The resulting suspension is transferred at room temperature onto a frit, repeatedly washed with n-heptane and dried to give a titanium-containing catalyst component (1) whose titanium content is 2.4% by weight.

Polymerization by means of above-described catalyst component (1)

A 1 liter autoclave is charged with 500 ml of isobutane and 125 mg of triisobutylaluminum (catalyst component (2)) and is brought at 90° C. with ethene to a total pressure of 38 bar. 60 mg of catalyst component (1) are then injected with ethene by way of a lock so that the total pressure in the autoclave rises to 14 bar. The total pressure of 40 bar and the temperature of 90° C. are maintained for 2 hours. The polymerization is then discontinued by releasing the pressure.

| Data of the polyethene obtained: | | | | | |
|---|---|---|---|---|---|
| [$\eta$]-value (according to DIN 53 728) | | | | | |
| 23 [dl/g] | | | | | |
| Bulk density (according to DIN 53 468) | | | | | |
| 390 [g/l] | | | | | |
| Catalyst activity | | | | | |
| 84,000 [$g_{PE}/g_{Ti}\cdot$h] | | | | | |
| Sieve analysis | | | | | |
| 0.125 | 0.125–0.250 | 0.250–0.5 | 0.5–1.0 | 1.0–2.0 | 2.0 [mm] |
| 0.1 | 51.7 | 45.7 | 2.1 | 0.4 | 0 [% by weight] |

We claim:

1. A process for preparing finely divided homopolymers of ethene or copolymers of ethene with minor amounts of $C_3$-$C_8$-alpha-monoalkene by polymerizing the monomer(s) at 30°–150° C. and 1–200 bar by means of a Ziegler catalyst system composed of (1) a titanium-containing catalyst component obtained as a precipitated product by bringing about a precipitation in a previously introduced organic liquid by introducing and bringing together with vigorous agitation (1.1) a 0.1–10M solution of titanium tetrachloride in a liquid saturated aliphatic and/or aromatic hydrocarbon of 5–10 carbon atoms, (1.2) a 0.1–10M solution of an organoaluminum compound of the empirical formula $R_nAlCl_{3-n}$, where n is a number within the range from 1.5 to 3 and R is alkyl of 1–12 carbon atoms, in a liquid saturated aliphatic and/or aromatic hydrocarbon of 5–10 carbon atoms and (1.3) a $C_2$-$C_8$-alpha-monoalkene and (2) an aluminum-containing catalyst component which is a trialkylaluminum which contains 1–12 carbon atoms per alkyl group, with the proviso that the atomic ratio of titanium in catalyst component (1):aluminum in catalyst component (2) lies within the range 1:1 to 1:200, which comprises using as the titanium-containing catalyst component (1) one where the precipitation has been brought about at temperatures within the range from −30° to +30° C. in a previously introduced organic liquid which, at the precipitation temperature, has a viscosity within the range from 1.5 to 30 mm$^2$/s and comprises (a) a liquid saturated aliphatic and/or aromatic hydrocarbon of 5–10 carbon atoms and (b), dissolved therein, relatively small amounts of a polymer of a $C_2$-$C_6$-alpha-monoalkene, with the provisos that (i) for every gram-mole of the total amount of titanium tetrachloride used a total of from 2 to 20 liters of the previously introduced organic liquid, a total of from 0.5 to 5 gram-moles of the organoaluminum compound and a total of from 5 to 500 gram moles of the alpha-monoalkene are used and (ii) for every mole unit of the total amount of titanium tetrachloride used from 0.002 to 0.15 mole units per minute are converted into precipitated product and from 0.02 to 1 mole unit per minute of the alpha-monoalkene are introduced into the precipitation system.

* * * * *